United States Patent [19]
Thornton

[11] Patent Number: 5,380,441
[45] Date of Patent: Jan. 10, 1995

[54] REMOVAL OF CHROMIUM FROM SOLUTION USING MECHANICALLY AGITATED IRON PARTICLES

[75] Inventor: Roy F. Thornton, Schenectady, N.Y.

[73] Assignee: General Electric Company, Schenectady, N.Y.

[21] Appl. No.: 120,990

[22] Filed: Sep. 15, 1993

[51] Int. Cl.$^6$ .................... B01D 21/00; C01F 1/52; B23H 3/00; C01G 49/00

[52] U.S. Cl. .................... 210/720; 210/724; 210/726; 210/913; 204/129.75; 204/149; 204/130; 423/55; 423/150.1

[58] Field of Search ............... 210/720, 726, 913, 724; 423/53, 55, 150.1; 204/129.1, 129.75, 149, 130, 105 R

[56] References Cited

U.S. PATENT DOCUMENTS

| | | | |
|---|---|---|---|
| 3,575,853 | 4/1971 | Gaughan et al. | 210/720 X |
| 3,728,238 | 4/1973 | Tarjanyi et al. | 204/149 |
| 3,922,224 | 11/1975 | Lewandowski | 210/720 X |
| 3,960,723 | 6/1976 | Butler | 210/720 X |
| 4,014,766 | 3/1977 | Watanabe et al. | 204/149 X |
| 4,108,770 | 8/1978 | Roy | 210/757 |
| 4,565,633 | 1/1986 | Mayenkar | 210/688 |

OTHER PUBLICATIONS

Article-1992 American Chemical Society, Chapter 7, Removal of Chromate from Aqueous Streams of Ultrafiltration and Precipitation, E. E. Tucker et al. pp. 84-98.

Article-Encyclopedia of Environmental Control Technology, vol. 4, Hazardous Waste Containment and Treatment, Paul N. Cheremisinoff, Editor, in collaboration with R. C. Ahlert et al (1990)-(total of 6 pages including title page).

Article-Remediation of Subsurface Chromium Contamination at a Former Manufacturing Facility, J. L. Pope and J. D. Goedtel, Groundwater Technology, Inc. pp. 1-14.

*Primary Examiner*—Donald R. Valentine
*Attorney, Agent, or Firm*—James Magee, Jr.

[57] ABSTRACT

Metallic iron particles are added to an aqueous solution containing hexavalent chromium and mechanically agitated. Enough of the surface of the iron particles remains precipitate-free to reduce substantially all the hexavalent chromium to trivalent chromium. Adjustment of pH allows the formation of insoluble precipitates which may be separated from solution using conventional techniques. The properties of the aqueous electrolyte solution are retained, and the solution may be reused.

8 Claims, No Drawings

REMOVAL OF CHROMIUM FROM SOLUTION USING MECHANICALLY AGITATED IRON PARTICLES

FIELD OF THE INVENTION

This invention relates to a method for removing hexavalent chromium from aqueous solution, and more particularly to the removal of hexavalent chromium by mechanically agitating iron particles in the solution thereby reducing hexavalent chromium to trivalent chromium.

BACKGROUND OF THE INVENTION

Metals such as chromium are often found in industrial effluents in the toxic hexavalent state and must be removed to eliminate possible health and environmental hazards. Examples of aqueous industrial solutions from which hexavalent chromium must be removed are industrial waste waters, rinse waters, chromium plating baths, etching solutions and electrochemical machining solutions.

In particular, industrial processes such as electrochemical machining of stainless steel alloys utilize aqueous electrolyte solutions such as sodium nitrate or sodium chloride. During the process at least part of the chromium contained in the alloy is converted to hexavalent chromium in the electrolyte solution where it remains in solution over a wide range of pH. Because the electrolyte is continuously reused, the accumulation of hexavalent chromium in solution represents a possible health hazard to machine operators. Also, most of the machined metal is converted to an oxide/hydroxide sludge which entrains some electrolyte and poses an environmental hazard. The sludge is thus disposed of as a hazardous waste at considerable expense. It is therefore desirable to diminish the chromium concentration in the electrolyte to as low a level as possible while still maintaining the properties of the aqueous electrolyte.

One common method for removing chromium from aqueous solutions involves the reduction of hexavalent chromium to trivalent chromium using sulfur dioxide or soluble sulfite-containing compounds such as sodium bisulfite, metabisulfite, or hydrosulfite after adjusting the pH to about 2-3 with sulfuric acid. The trivalent chromium produced is then precipitated from solution with a base such as sodium hydroxide after the solution pH has been adjusted to make it alkaline. The precipitated chromium is then separated from the solution using common techniques such as settling or filtration, for example. However, use of this method for removal of chromium from electrolyte solutions is undesirable because further treatment is necessary to remove sulfur compounds from the solution.

Another well-known method for removing chromium from aqueous solutions involves ferrous ion reduction of hexavalent chromium to trivalent chromium and subsequent precipitation of the trivalent chromium after adjusting the pH. Typically, ferrous sulfate ($FeSO_4$) or ferrous chloride ($FeCl_2$) is used as the reducing agent, and chromic hydroxides and iron hydroxides are formed and precipitated under alkaline conditions. However, the sulfate or chloride remains in solution and may require further removal treatment. A procedure to remove the dissolved sulfate from a contaminated sodium nitrate solution, for example, is disclosed in copending commonly owned Application Ser. No. 08/080549 where barium nitrate is added to the solution to induce precipitation of the sulfate ion. Sodium hydroxide is then added to complete the precipitation of the iron and chromium species. Alternatively, barium hydroxide may be used instead of barium nitrate, and the addition of nitric acid is required to neutralize the sodium hydroxide formed.

Alternatively, ferrous ions can be introduced into solution by electrochemical generation. A chromium-contaminated aqueous solution is passed between cold-rolled steel electrodes, and the direct current between the electrodes forms ferrous ions ($Fe^{+2}$) at the anode and hydrogen gas and hydroxide at the cathode. Hexavalent chromium is reduced by the ferrous ion to trivalent chromium, and the ferrous ion is oxidized to the ferric ion ($Fe^{+3}$). For every mole of hexavalent chromium reduced, three moles of ferrous iron must be oxidized. Trivalent chromium, ferric ions, and leftover ferrous ions remaining in solution react with hydroxide formed at the cathode to form insoluble chromium and iron hydroxides. A polymer is then added to the solution to accelerate precipitation of the hydroxides which can subsequently be filtered from the solution. However, the method is disadvantageous for removing chromium from aqueous solutions because expensive and complex equipment must be utilized to generate the ferrous ions.

To eliminate the necessary step of sulfate precipitation and to avoid the costly and complex process of ferrous ion generation, the development of an inexpensive and efficient method of ferrous reduction which introduces no new ions to the electrolyte solution is desirable. For example, sodium nitrate is a common electroyte used in electrochemical machining, and a ferrous reducing agent that adds only nitrates or hydroxides to solution is preferable for the removal of chromium. However, ferrous nitrate is not commercially available and its use would thus be impractical.

SUMMARY OF THE INVENTION

The present invention is a method for removing hexavalent chromium from aqueous electrolyte solutions based on the reduction of hexavalent chromium to trivalent chromium by mechanically agitating metallic iron particles in the chromium-containing solution at a pH which promotes conversion of hexavalent chromium to trivalent chromium followed by precipitation of the resulting trivalent chromium. Only one mole of iron is required to react with each mole of hexavalent chromium as compared with three moles of ferrous ion in other electrochemical processes. Substantially all the chromium is removed from solution thereby reducing the toxicity of the solution and its potential hazard to the environment. The invention has the additional advantage of being inexpensive to practice.

The invention avoids the problems associated with other ferrous ion reduction methods whereby additional unwanted ions remain in solution requiring subsequent treatment for their removal. Instead, the electrolyte is restored to its original condition after the removal of chromium, and the electrolytic properties of the solution are retained. Thus, the electrolyte may be reused.

Accordingly, the invention is a method for removing hexavalent chromium from an aqueous solution, which comprises:

adding an effective amount of metallic iron particles to the aqueous solution to react with the hexavalent chromium to produce trivalent chromium;

mechanically agitating the metallic iron particles in the aqueous solution using sufficient energy to provide a substantially precipitate-free surface on the iron;

maintaining the pit of the aqueous solution with an acid to a level between about 2 and 7 until an acceptable concentration of hexavalent chromium has been reached; and adjusting the pH of the aqueous solution with a base to a level sufficient to precipitate substantially all trivalent chromium in the aqueous solution.

In addition to maintaining the pH between about 2 and 7, a chemical reaction occurs during the acid adding step of the method of the present invention whereby

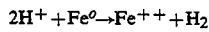

$$2H^+ + Fe^0 \rightarrow Fe^{++} + H_2$$

The ferrous ion thus produced can be added to any aqueous solution containing hexavalent chromium for reduction to trivalent chromium. For example, a reactor utilizing agitated iron particles could be used to generate ferrous ions in a solution which could then be injected into any process or wastewater stream containing hexavalent chromium. The ferrous ions would reduce the hexavalent chromium to trivalent chromium. Iron and chromium hydroxides formed would then precipitate if the pH were high enough or if the pH were raised to an alkaline value.

Therefore, another aspect of the present invention is a method for preparing ferrous iron in solution, such method comprising:

adding metallic iron particles to an aqueous solution;

mechanically agitating the metallic iron particles in the aqueous solution using sufficient energy to provide a sufficiently precipitate-free surface on the iron; and adding acid to the aqueous solution to react with the metallic iron to form ferrous iron.

DETAILED DESCRIPTION OF THE INVENTION

Metallic iron is added to the solution whereby hexavalent chromium is reduced to trivalent chromium, and iron is oxidized to ferric iron. One mole of iron is required to react with each mole of hexavalent chromium. Insoluble hydroxides of iron and chromium form on the surface of the iron particles and must be removed to provide additional metallic surfaces for subsequent reduction of hexavalent chromium. Thus, the iron particles must be mechanically agitated with a sufficient amount of energy to ensure that part of the surface of the iron is free from precipitate. Also, the addition of acid aids in keeping the surface of the iron free of precipitate.

Any metallic source of iron such as steel, cast iron or other iron alloys may be used to introduce iron particles to the chromium-containing solution. Scrap metal, for example, can be used for economic reasons. The size of the iron particles is not critical but must be sufficiently large to provide enough abrasion to clean the surface of the particles as they are agitated. Steel particles of about ¼ inch in diameter have been successfully used, for example.

The amount of iron particles necessary for complete reduction of hexavalent chromium will depend on the concentration of chromium contained in the electrolyte solution and the volume of the solution. Sufficient iron must be combined with sufficient agitation to provide the desired rate of reaction with the hexavalent chromium. Generally, an excess of the stoichiometric amount necessary to react with the hexavalent chromium to produce trivalent chromium is necessary.

Addition of acid is necessary to maintain a solution pH preferably from about 4 to about 5. At a pH above 7, the metallic iron is known to passivate, and the rate of reduction of hexavalent chromium may become unacceptably low. As the pH is reduced below 4, reduction by iron of nitrate ions, as found in electrochemical machining sodium nitrate solutions, for example, to nitrite ion becomes increasingly rapid. In addition, the rate of the corrosion of the iron by hydrogen ions becomes increasingly rapid as the pH is lowered below 4.

The acid used to adjust the pH must also not introduce additional ions to the solution. For example, in sodium nitrate solutions, the acid should be nitric acid. As another example, if the electrolyte solution is sodium chloride, hydrochloric acid should be used.

When the concentration of hexavalent chromium has reached an acceptably low level, the nitric acid addition and agitation of the iron particles is stopped. The pH of the solution is then adjusted to between about 8 and 10 to precipitate substantially all the trivalent chromium as well as the iron. Where sodium nitrate is the electrolyte, addition of sodium hydroxide to make the solution basic is preferred.

Essentially all the chromium and iron precipitate out of solution and can be removed by conventional methods such as settling, filtration, or centrifugation. The remaining species in the solution is the electrolyte itself, such as sodium nitrate.

The invention is illustrated by the following example.

EXAMPLE

An aqueous solution was prepared in which the concentration of sodium nitrate was 270 grams per liter, the concentration of sodium chromate was 0.311 grams per liter, and the concentration of sodium molybdate dihydrate was 0.250 grams per liter. Steel nuts, approximately ¼ inch in diameter, were degreased, and 570 grams were put in the barrel of a small barrel plater. The barrel was 6.2 cm inner diameter and 9.9 cm long.

Two liters of the solution were put in a plastic beaker, and a magnetic stirring bar was used to stir the solution. The barrel was completely immersed in the solution and rotated at 16 rpm. The pH of the solution was controlled at chosen set points by a pit controller and a pump which fed 1.0 normal (N) nitric acid into the solution. During this process the solution became progressively more opaque with brown precipitate.

The following table shows the decrease in concentration of chromium in samples of the solution as the reaction proceeded. The solution pH was 6 from 0.0 to 0.8 hr, 5 from 0.8 to 1.7 hr, and 4 from 1.7 to 7.2 hr. The samples were treated by raising the pH to 8 using sodium hydroxide and centrifuging to remove precipitates.

| Change in Cr(VI) Concentration | |
|---|---|
| Time, Hr. | Cr(VI), ppm |
| 0.0 | 90 |
| 1.7 | 70 |
| 3.8 | 38 |
| 5.4 | 12 |

-continued

| Change in Cr(VI) Concentration | |
|---|---|
| Time, Hr. | Cr(VI), ppm |
| 7.2 | 0 |

The final concentration of chromium in the treated solution was less than the detection limit of 0.5 μg/mL. Permanganate titration of the final sample showed no oxidizable species present above 0.008 equivalents per liter. This titration showed that nitrite ion concentration was less than 0.004 moles per liter (M) indicating that the rate of reaction of nitrate ions with the iron was negligible.

What is claimed is:

1. A method for removing hexavalent chromium from an electrochemical machining solution, which comprises:

adding an excess of a stoichiometric amount of metallic iron particles to the electrochemical machining solution to react with the hexavalent chromium to produce trivalent chromium;

mechanically agitating the metallic iron particles in the electrochemical machining solution with a sufficient amount of energy to insure that surfaces of the iron particles are free of insoluble precipitates selected from the group consisting essentially of iron hydroxide and chromium hydroxide;

maintaining a pH of the electrochemical machining solution with an acid between about 2 to about 7 until the hexavalent chromium is reduced to trivalent chromium; and then adjusting the pH of the electrochemical machining solution with a base to precipitate the trivalent chromium.

2. A method according to claim 1 wherein the electrochemical machining solution functions as an electrolyte.

3. A method according to claim 2 wherein the electrolyte is sodium nitrate.

4. A method according to claim 3 wherein the concentration of sodium nitrate is about 50 grams per liter to about 600 grams per liter.

5. A method according to claim 3 wherein the acid is nitric acid.

6. A method according to claim 2 wherein the electrolyte is sodium chloride.

7. A method according to claim 6 wherein the acid is hydrochloric acid.

8. A method according to claim 1 wherein the final pH of the aqueous solution is in the range of about 8 to about 10.

* * * * *